United States Patent [19]

Hergenrother et al.

[11] 4,242,494
[45] Dec. 30, 1980

[54] POLYPHOSPHAZENE POLYMERS CONTAINING ALKENYL SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 68,036

[22] Filed: Aug. 20, 1979

[51] Int. Cl.³ .............................................. C08G 83/00
[52] U.S. Cl. .................................. 528/168; 528/374; 528/392; 528/399
[58] Field of Search ................. 528/168, 374, 392, 399

[56] References Cited

U.S. PATENT DOCUMENTS

| | | | |
|---|---|---|---|
| 4,026,839 | 5/1977 | Dieck et al. | 260/30.4 R |
| 4,182,837 | 1/1980 | Hergenrother et al. | 528/399 |

*Primary Examiner*—Wilbert J. Briggs, Sr.

[57] ABSTRACT

Polyphosphazene polymers are prepared which contain repeating units represented by the formulas:

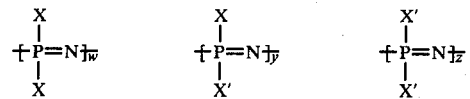

wherein X and X' are the same or different and are represented by:

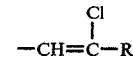

wherein R is selected from the group consisting of hydrogen and unsubstituted and substituted alkyl, aryl, and heterocyclic groups; X' may additionally be selected from the group consisting of chloro- and substituted or unsubstituted alkoxy, aryloxy, amino and mercapto radicals or a mixture thereof; and $20 \leq (w+y+z) \leq 50,000$.

The polymers of the invention can be utilized in applications such as molding, coatings, foams and the like.

14 Claims, No Drawings

POLYPHOSPHAZENE POLYMERS CONTAINING ALKENYL SUBSTITUENTS

BACKGROUND OF THE INVENTION

Polyphosphazene polymers containing repeating $+P=N+$ units in which various unsubstituted and substituted alkoxy, aryloxy, amino and mercapto groups are attached to the phosphorus atom and their method of preparation are described in the prior art as illustrated in the publication "Phosphorus-Nitrogen Compounds," Academic Press, New York, New York, 1972, by H. R. Allcock, and "Poly(Organophosphazenes)," Chemtech, Sept. 19, 1975, by H. R. Allcock and in such U.S. Pat. Nos. as 3,515,688; 3,702,833; 3,856,712; 3,974,242 and 4,042,561; which are hereby incorporated by reference.

However, none of the aforementioned publications or patents or for that matter, none of the prior art of which the applicants are aware, discloses or suggests polyphosphazene homopolymers or copolymers containing alkenyl substituents attached directly to the phosphorus atom or to methods of preparing such polymers.

SUMMARY OF THE INVENTION

This invention relates to polyphosphazene homopolymers and copolymers containing repeating $+P=N+$ units in the polymer chain in which alkenyl substituents are attached directly to the phosphorus atom. More particularly, the invention relates to polyphosphazene polymers having substituents attached to the phosphorus atom which are derived from acetylene containing compounds and to a method of preparing such polymers. Optionally, any other substituent groups, such as alkoxy, aryloxy, amino and mercapto groups which are compatible with alkenyl substituents and are known in the polyphosphazene state of the art may be substituted onto the polyphosphazene in addition to the alkenyl substituents. These optional substituents may be substituted onto the polyphosphazene by the method disclosed in the present invention or by prior art methods.

An additional advantage in the substitution of an alkenyl containing substituent onto the phosphazene polymer is that the alkenyl group can be reacted with reagents that can convert it into a derivative which can not directly be prepared and that it offers a cure site adjacent to the polymer backbone.

DETAILED DESCRIPTION OF THE INVENTION

The polymers of the invention contain repeating units represented by the formulas:

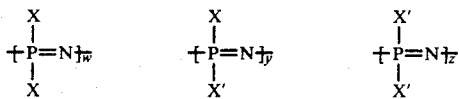

wherein X and X' are the same or different and are represented by:

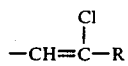

wherein R is independently selected for each unit from the group consisting of hydrogen and substituted and unsubstituted alkyl, aryl, and heterocyclic radicals, and X' can be a chloro radical, substituted or unsubstituted alkoxy, aryloxy, amino and mercapto radicals or a mixture of such radicals which are known in the state of the art in poly(phosphazene) technology and which are compatible with alkenyl substituents. The polymer can contain from 20 to 50,000 of such units such that $20 \leq (w+y+z) \leq 50,000$. The various substituted groups, R and X', can be substituted themselves with any "non-reactive" substituent, i.e., a substituent which is non-reactive with the various materials present during polymer formation. Suitable "non-reactive" substituents include chloro, bromo, nitro, cyano, alkyl, aryl, aryloxy, alkoxy and the like.

One skilled in the art readily will recognize that steric hindrance will dictate the propriety of using relatively bulky groups in the ortho-position on the aryl acetylene rings, since, as set forth hereinafter, the polymers are made by reacting an acetylene containing aryl compound with a chlorine atom on a phosphorus atom. Desirably, groups which sterically inhibit this reaction should be avoided. With the foregoing proviso in mind, the selection of the substituents on the R radical when R represents an aryl radical will be dependent on the position of the acetylenic group on the aryl radical and will be apparent to one skilled in the art.

In the polymer units represented by the above formulas, all X substituent groups can be the same or they can be mixtures of different alkenyl groups and the X' substituent groups can be the same or they can be mixtures of chloro, alkoxy, aryloxy, amino and mercaptan groups.

When the term polymer is used herein it will include within its meaning both homopolymers and copolymers of substituted polyphosphazenes.

The phosphazene polymers of the invention can be represented by the formula:

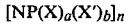

wherein n is from 20 to 50,000 and $(a+b)=2$, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like, the copolymer should contain at least 10 mole percent by weight and preferably at least 25 mole percent by weight of the alkenyl substituent.

Due to the presence of an unsaturated carbon bond in the substituents of the present invention, the polymers which are formed can be crosslinked using the alkenyl group as a cure site. Where the presence of further crosslinking functionality is desired, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,073,824; 4,083,825; and 4,076,658; which are hereby incorporated by reference and include $-OCH=CH_2$ and $-OR_3CF=CF_2$, as well as similar groups which contain unsaturation. Generally, when present the moieties containing crosslinking functionality are usefully present in an amount between about 0.1 mole percent and to about 50 mole percent and usually between about 0.5 mole percent to about 10 mole percent based on the replaceable chlorine in the starting poly(dichlorophosphazene). These additional cure cites are included within the definition and scope of substituted alkoxy substituents.

The polymers of the present invention can be used to prepare protective films and can be utilized in applications such as moldings, coatings, foams, fibers and the like.

METHOD OF PREPARATION

The polymers are prepared by reacting a poly(dichlorophosphazene) having the formula $-(NPCl_2)_n-$, in which n is from 20 to 50,000 in the presence of a tertiary amine with either one or more acetylene containing compounds, or a mixture of one or more acetylene containing compound with one or more additional compounds which are reactive with the poly(dichlorophosphazene) to form a copolymer having at least two different substitution groups on the backbone of the polyphosphazene. Examples of the additional compounds used to form copolymers are illustrated in the section entitled, "Additional Reactive Compounds," below.

I. The Poly(dichlorophosphazene) Polymer

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $(NPCl_2)_m$, in which m is an integer from 3 to 7, with the cyclic trimer and tetramer often comprising up to 90 percent of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about $10^{-1}$ Torr to superatmospheric and reaction times can range from 30 minutes to about 48 hours.

A preferred process for preparing the poly(dichlorophosphazene) polymers used in the process of this invention is described in the aforementioned incorporated U.S. Pat. No. 4,005,171.

II. The Acetylene Group Containing Compounds Useful in Forming the Polymers of the Invention The acetylene group containing compounds which can be employed in producing the polymers of the invention are represented by the following structural formula:

wherein R is selected from the group consisting of hydrogen, alkyl, aryl and heterocyclic radicals. When R is an alkyl or aryl radical it can be substituted with a substituent or a number of substituents which are non-reactive with the various materials during polymer formation. Suitable substituents include chloro, bromo, nitro, cyano, alkyl, aryl, alkoxy, aryloxy, heterocyclic radicals and the like. When R is an alkyl radical it is preferred that R contain from 1 to 12 carbon atoms and R can also be cycloalkyl.

Illustrative examples of unsubstituted acetylene group containing compounds which can be suitably employed in the present invention include acetylene (ethyne), propyne, 1-butyne, 1-pentyne, 3-methyl-1-butyne, 1-hexyne, 3-methyl-1-hexyne, 4-methyl-1-hexyne, 3-methyl-1-heptyne, 4-methyl-1-heptyne, 4-ethyl-1-heptyne, 5-methyl-1-heptyne, 1-octyne, 1-nonyne, 1-decyne and the like; acetylenylcyclohexane, propynylcyclohexane and the like; phenylacetylene and napthylacetylene and the like; 1,2-dimethyl-5-ethynylpyrrole, 1-methyl-4-ethynylpyrozole, 1,2,5-trimethyl-4-ethynylimidazole and the like. These compounds can be further substituted with any substitution group or groups which do not interfere with the reaction between the acetylene group and the poly(dichlorophosphazene) with any of the above-identified substituents.

The preferred acetylene containing compounds for use in the present invention are phenylacetylene and propyne.

III. Additional Reactive Compounds

As indicated heretofore, the polyphosphazene copolymers of the invention in addition to the alkenyl substituent group can contain residual chloro groups or substituted or unsubstituted alkoxy, aryloxy, amino or mercapto groups or mixtures thereof.

Preferred substituent groups represented by X' for use in these copolymers are:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol, and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7,-dodecafluoroheptanol and the like. In instances where it is desired to incorporate mixed X' substituent groups in the copolymer, mixtures of the foregoing alcohols can be employed.

Aryloxy groups (substituted or unsubstituted) derived from aromatic alcohols including among others phenol; alkylphenols, such as cresols, xylenols, p-, o-, and m-ethyl and propyl phenols and the like; halogen-substituted phenols such as p-, o-, and m-chloro and bromophenols and di- or tri-halogen substituted phenols and the like; and alkoxy-substituted phenols such as 4-methoxyphenol, 4-(n-butoxy)phenol and the like. Mixtures of the foregoing aromatic alcohols can also be employed.

Amino groups derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al (hereby incorporated by reference) may be utilized. Representative of suitable mercaptan compounds as described in the aforementioned patent are methyl mercaptan and its homologs, ethyl, propyl, butyl, aryl and hexyl mercaptan, thiophenol, thionaphthols, benzyl mercaptan, cyclohexyl mercaptan and the like.

Mixtures of any combination of the above recited compounds can be used to prepare the copolymers of the present invention.

IV. The Tertiary Amine

The use of tertiary amines in preparing the polymers of the invention minimizes undesirable side reactions and at the same time acts as an effective acid scavenger.

Tertiary amines which can be employed in preparing the polymers of the invention are those represented by the general structure:

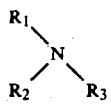

wherein $R_1$, $R_2$ and $R_3$ can each be alkyl containing from 1 to 8 carbon atoms. Thus, for example, the tertiary amine can be a trialkyl amine such as trimethylamine, triethylamine, triisopropylamine, tri-n-propylamine, tri-isobutylamine, tri-n-butylamine and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine; N-methyl morpholine; n-methyl pyrrole; 1,4-diaza-bicyclo(2.2.2)octane (DABCO) and dipiperidyl ethane.

As indicated above, the polymers of the present invention are prepared by reacting the poly(dichlorophosphazene) polymer and the acetylene group containing compound or a mixture of such compounds in the presence of a tertiary amine. Optionally, compounds listed in the group of "Additional Reactive Compounds" which can be substituted onto the poly(dichlorophosphazene) in the presence of a tertiary amine can be employed in the reaction mix.

The specific reaction conditions and proportion of ingredients employed in preparing these polymers can vary somewhat depending on factors such as the reactivity of the specific acetylene containing compound utilized, the particular tertiary amine employed, and degree of substitution desired in the finished polymer. In general, reaction temperature can range from about 25° C. to about 200° C. and times can range from 3 hours up to 7 days; lower temperatures necessitating longer reaction times and higher temperatures necessitating longer reaction times and higher temperatures allowing shorter reaction times. These conditions are, of course, utilized in order to obtain the most complete reaction possible, i.e., in order to insure the substantial conversion of the chlorine atoms in the polymer to the corresponding alkenyl substituents and form a substantially hydrolytically stable polymer. The reaction which occurs is the replacement of the chlorine atom on the poly(dichlorophosphazene) backbone with an alkenyl group which is formed from the partial saturation of the acetylene group as the alpha-carbon in the acetylene group replaces the chlorine atom on the polyphosphazene which in turn attaches to the beta-carbon of the newly formed alkenyl radical.

The above reaction is ordinarily carried out in the presence of a solvent or a mixture of solvents. The solvent employed in the reaction should be a solvent for the poly(dichlorophosphazene) polymer, the acetylene containing compound, the tertiary amine and the additional reactive compound is present. Aliphatic and aromatic hydrocarbons and chlorinated hydrocarbons are the preferred solvents. Examples of suitable solvents which may be employed include cyclohexane, chloroform, methylene chloride, toluene and xylene. The amount of solvent is not critical and any amount sufficient to solubilize the reaction mixture materials can be employed. In addition, the materials in the reaction zone should be reasonably free of water. The prevention of substantial amount of water in the reaction system is necessary in order to inhibit the undesirable side reaction of the available chlorine atoms in the chloropolymer. Preferably, the reaction mixture should contain less than about 0.01 percent water.

In general, the amount of acetylene containing compound and, if present, the other compounds which are substitutionally reactive with poly(dichlorophosphazene) employed in the process should be at least molecularly equivalent to the number of available chlorine atoms in the starting polymer. However, if desired, an excess of such compounds may be employed in order to insure substantially complete reaction of all the available chlorine atoms.

While the alkenyl substituted poly(phosphazene) polymers and copolymers of the present invention have been prepared in the above-identified manner, that is, in the presence of a tertiary amine, alternative methods of preparation are available for preparation of the copolymer.

The prior art methods of poly(dichlorophosphazene) substitution such as by reaction with sodium alkoxide as demonstrated in U.S. Pat. No. 3,370,020 to Allcock et al, cannot be used to prepare the phosphazene homopolymers of the present invention as the salt of the acetylenic compound can not be formed.

The poly(dichlorophosphazene) polymer can be partially substituted with alkenyl groups using the tertiary amine process. The prior art method of Allcock et al can then be used to replace all or some of the remaining chlorines on the partially substituted poly(dichlorophosphazene) with substituents derived from the compounds listed in the list of "Additional Reactive Compounds."

The following examples are submitted for the purpose of further illustrating the nature of the present invention and are not intended as a limitation on the scope thereof. Parts and percentages referred to in the examples and throughout the specification are by weight unless otherwise indicated. All temperatures are degrees of Centigrade unless otherwise specified.

EXAMPLE 1

Preparation of $[(C_6H_4CCl=CH)_2 P=N]_n$

A 10-ounce bottle was charged with 9.66 cc (88 millimoles) of phenyl acetylene, 12.33 cc (88 millimoles) of triethylamine, 50 cc of toluene, and 137.5 gms. (40 millimoles) of a 3.37% toluene solution of poly(dichlorophosphazene). The bottle and its contents were heated at 120° C. for 110 hours during which period the contents changed in color from colorless to orange and a small amount of triethylamine hydrochloride was formed. The contents of the bottle were cooled to room temperature and were subjected to Infrared spectroscopy which showed a complete loss of the P-Cl band at 600 cm$^{-1}$ and the formation of new bands at 568 cm$^{-1}$, 552 cm$^{-1}$, and 532 cm$^{-1}$. The contents of the bottle were coagulated in methanol to yield 6.96 gms. of a tan plastic polymer having a $T_g$ of 28° C., and a $T_m$ of 245° C. Elemental analysis of the tan plastic polymer was as follows:

|  | C | H | N | P | Cl |
|---|---|---|---|---|---|
| Actual[1] (%) | 49.86 | 5.65 | 6.16 | 13.72 | 6.72 |
| Calculated (%) | 49.53 | 3.50 | 6.25 | 13.82 | 9.13 |

[1]Calculates to 82.9% [(C$_6$H$_5$CCl=CH)$_2$PH]$_n$ and 14.9% hydrolyzed chloropolymer.

EXAMPLE 2

Preparation of $+(C_6H_5CCl=CH)(CF_3CH_2O)P=N+_n$

A 10-ounce bottle was charged with 4.8 cc (44 millimoles) of phenylacetylene, 3.2 cc (44 millimoles) of trifluoroethanol, 100 cc of dry alcohol free chloroform, 12.3 cc (88 millimoles) of triethylamine, and 36.0 gms. (39.8 millimoles) of a 12.8% solution of poly(dichlorophosphazene) in chloroform.

The bottle and its contents were heated for 68 hours at 120° C. The contents of the bottle were cooled to room temperature and were subjected to Infrared spectroscopy which indicated a complete loss of the P-Cl band at 600 cm$^{-1}$. Upon coagulation, the contents of the bottle yielded 12.6 gms. of a black rubber.

EXAMPLE 3

Preparation of $+(C_6H_5CCl=CH)(p-ClC_6H_4O)P=N+$

The same procedure and materials were used as in Example 2 except the trifluoroethanol was replaced with 4.43 cc (44 millimoles) of para-chlorophenol. When subjected to Infrared spectroscopy, the polymer which was obtained showed the loss of the P-Cl band at 600 cm$^{-1}$ and the formation of new bands at 565 cm$^{-1}$, 534 cm$^{-1}$ and 518 cm$^{-1}$. Upon coagulation the contents of the bottle yielded 7.3 gms. of a brown rubbery polymer.

Claims:

1. A polyphosphazene polymer containing units represented by the formulas:

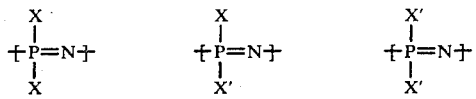

wherein X is —CH=CCl—R in which R is independetly selected for each unit from the group consisting of hydrogen and substituted and unsubstituted alkyl, aryl and heterocyclic radicals and wherein X' is the same as X or is selected from the group consisting of chloro radicals and substituted and unsubstituted alkoxy, aryloxy, amino, mercapto radicals and mixtures thereof, said polymer containing 20 to 30,000 of said units.

2. The polymer of claim 1 in which X and X' are derived from phenyl acetylene.

3. The polymer of claim 1 in which X is derived from phenyl acetylene.

4. The polymer of claim 3 in which X' is derived from trifluoroethanol.

5. The polymer of claim 3 in which X' is derived from para-chlorophenol.

6. The polymer of claim 1 in which X is derived from propyne.

7. The polymer of claim 6 in which X' is derived from trifluoroethanol.

8. The polymer of claim 6 in which X' is derived from para-chlorophenol.

9. The polymer of claim 1 in which X' is derived from a compound selected from a group consisting of trifluoroethanol, para-chlorophenol and mixtures thereof.

10. The polymer of claim 1 in which the polymer units are randomly distributed.

11. A method of preparing polyphosphazene polymer containing units represented by the formulas:

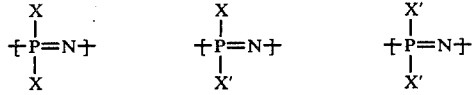

wherein X is —CH=CCl—R in which R is independently selected for each unit from the group consisting of hydrogen and substituted and unsubstituted alkyl, aryl and heterocyclic radicals and wherein X' is the same as X or is selected from the group consisting of chloro radicals and substituted and unsubstituted alkoxy, aryloxy, amino, mercapto radicals and mixtures thereof; said method comprising reacting a poly(dichlorophosphazene) polymer having a formula—(NPCl$_2$)$_n$—, wherein n is from 20 to 50,000, with an acetylene group containing compound and optionally with a compound selected from a group consisting of substituted and unsubstituted alkanols, aromatic alcohols, amines, mercaptans and mixtures thereof in the presence of a tertiary amine.

12. The method of claim 11 in which X is derived from a compound selected from the group consisting of phenyl acetylene and propyne.

13. The method of claim 12 in which the alkanol is selected from the group consisting of trifluoroethanol, para-chlorophenol and mixtures thereof.

14. The method of claim 12 in which the tertiary amine is triethylamine.

* * * * *

UNITED STATES PATENT AND TRADEMARK OFFICE
CERTIFICATE OF CORRECTION

PATENT NO. : 4,242,494

DATED : December 30, 1980

INVENTOR(S) : William L. Hergenrother and Adel F. Halasa

It is certified that error appears in the above-identified patent and that said Letters Patent are hereby corrected as shown below:

Column 7, line 11

" $600 \text{ cm}^{31\ 1}$ " should read -- $600 \text{ cm}^{-1}$ --

Signed and Sealed this

Twenty-fourth Day of March 1981

[SEAL]

Attest:

RENE D. TEGTMEYER

Attesting Officer

Acting Commissioner of Patents and Trademarks